June 2, 1936.  C. FERRO  2,042,774
LOCKING DEVICE FOR MOTOR VEHICLE WHEELS
Filed June 16, 1934  2 Sheets-Sheet 1
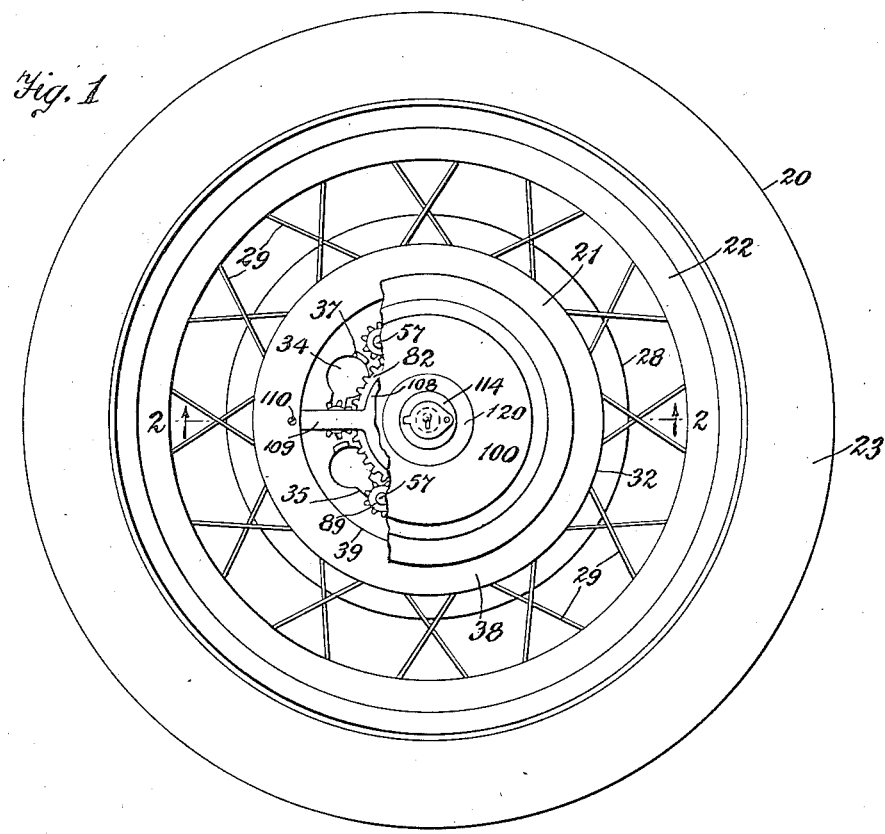
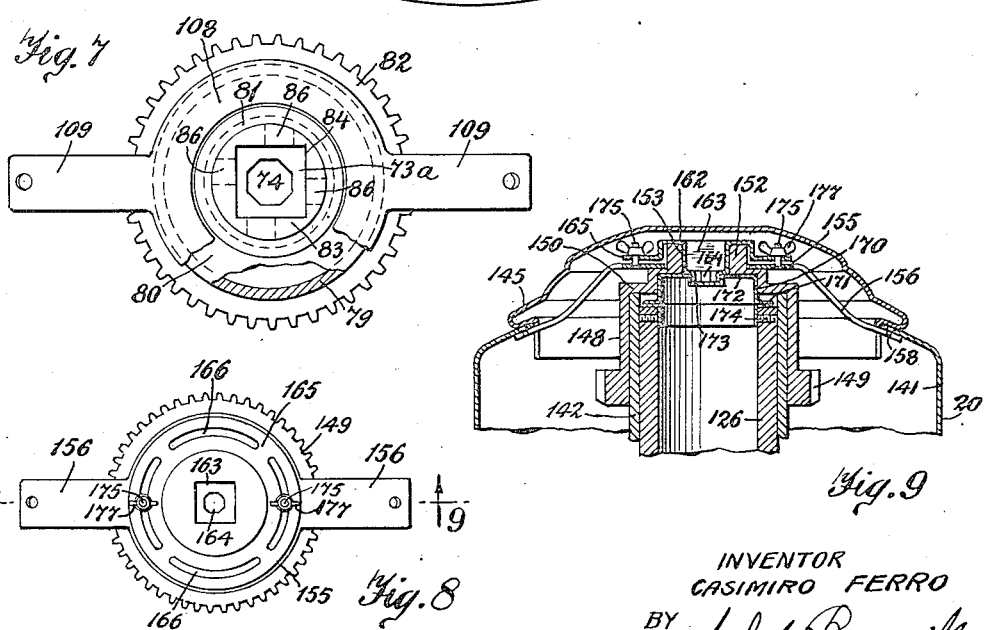
INVENTOR
CASIMIRO FERRO
BY
ATTORNEY

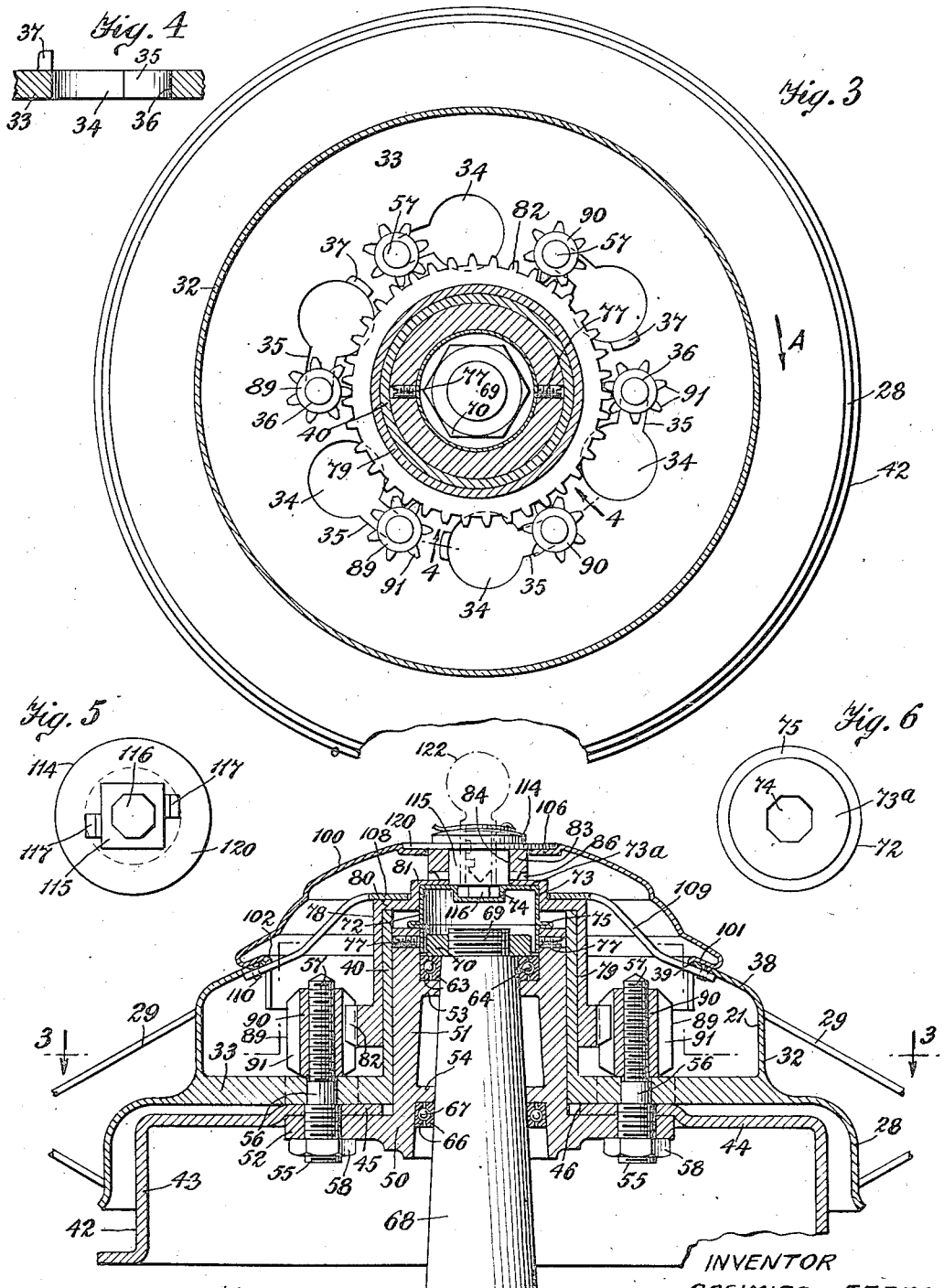

Patented June 2, 1936

2,042,774

UNITED STATES PATENT OFFICE 2,042,774

LOCKING DEVICE FOR MOTOR VEHICLE WHEELS

Casimiro Ferro, Bayonne, N. J.

Application June 16, 1934, Serial No. 730,854

2 Claims. (Cl. 301—9)

This invention relates to a locking device for motor vehicle wheels.

The object of the invention is the production of a locking device for motor vehicle wheels, wherewith a wheel can be easily locked to, and disengaged from a vehicle.

The second object of the invention is the production of a locking device for motor vehicle wheels which will remain locked during the rotations of the wheel.

Fig. 1 represents an outside elevation partly broken away, of the improved locking device for motor vehicle wheels; Fig. 2 shows an enlarged section of Fig. 1 on the line 2—2; Fig. 3 indicates a section of Fig. 2 on the broken line 3—3; Fig. 4 is a partial section of Fig. 3 on the line 4—4; Fig. 5 shows a bottom plan view of the supplemental lock for the device; Fig. 6 shows a top view of an element of the invention; Fig. 7 represents a top view of some elements; Fig. 8 represents a plan view of a modification of the locking device and Fig. 9 is a section of Fig. 8 on the line 9—9.

Referring to Figs. 1 to 7 of the drawings, an automobile wheel is indicated in its entirety by the numeral 20, having the hub 21, the felly 22, and the shoe 23 for the pneumatic tube. The radially outer portion of the hub 21 has integral therewith the cylindrical flange 28. Wire spokes 29 extend between the hub 21 and the felly 22 of the wheel.

The hub 21 comprises the cylindrical shell 32, which joins with the flat clamping and locking wall 33. A plurality of circular openings 34 are indicated in the wall 33, and the latter join with the curved openings 35. The walls of the openings 35, at their ends are connected by the curved end portions 36. Stop lugs 37 extend from the wall 33, adjacent to certain of the openings 34. The walls of the openings 35 are concentric with the axial center of the wall 33 and a circle struck through the middle portions of the openings 35, extends through the middle portions of the openings 34. The shell 32 joins with the converging wall 38, having the opening 39. A cylindrical sleeve 40 extends from the wall 33.

The brake housing of the wheel is indicated in its entirety by the numeral 42, and comprises the cylindrical shell 43, the head 44, with the flange 45, having the central opening 46.

An inner hub is indicated in its entirety by the numeral 50, and comprises the barrel 51, which at its inner end has integral therewith the radial flange 52. An outer annular disc 53, and an inner annular disc 54 extend from the inner face of the barrel 51.

A plurality of studs are each indicated with the threaded portion 55, the shank 56, smaller in diameter than the portion 55, and the outer threaded stem 57, smaller in diameter than the shank 56. The threaded portions 55 of the studs extend through the flange 52, and the flange 45, of the head 44. Nuts 58 clamp the said studs in place.

Ball bearing races 63, for the ball bearings 64, bear on the disc 53, and ball bearing races 66, for the ball bearings 67 bear on the disc 54.

The axle for the wheel is indicated at 68, and has integral therewith the threaded shank 69. A clamping nut 70 is provided for the shank 69.

A grease pot 72 is indicated, having the cylindrical wall 73, the head 73a, with the octagonal pocket 74, and the outer flange 75. The inner end of the grease pot extends into the barrel 51, and the flange 75 bears on the outer end of said barrel. Screws 77 in threaded engagement with the barrel 51 keep the grease pot 72 in place.

A cap indicated in its entirety by the numeral 78 is rotatably supported on the sleeve 40. The said cap 78 comprises the cylindrical shell 79, having the head 80, with the cylindrical projecting portion 81. The inner end of the shell 79 has integral therewith the spur gear 82. From the portion 81 extends the cylindrical barrel 83, having the longitudinal rectangular opening 84 and four locking openings 86, extend through the wall of the barrel 83.

A plurality of locking pinions 89 are each indicated having the clamping barrel 90, from which extend the teeth 91 which are in mesh with the teeth of the spur gear 82. The said locking pinions are in threaded engagement with the threaded stems 57 of the studs.

A detachable hood-shaped cap is designated in its entirety by the numeral 100. At the lower edge of said cap is indicated the return bend annular portion 101 having the curved end 102. At the top of the said hood 100 is indicated the depressed annular flange 106. The cap 100 is snapped in place by detachably locking the curved end 102, with the edge of the cylindrical opening 39, of the hub 21.

Upon the head 80 of the cap 78 is positioned the annular bearing ring 108, which has integral therewith the radially extending arms 109, the outer ends of which bear against the inner face of the wall 38 of the hub 21, and are detachably fastened thereto by the screws 110. The bearing ring 108 maintains the cap 78 in operative position. A supplemental lock is designated in its entirety by the numeral 114, and is shown with the barrel 115, square in cross section, and from the latter extends the octagonal plug 116, which is adapted to be seated in the pocket 74. The bolts of the lock are indicated at 117. A flange 120 extends from the barrel 115, which is adapted to be seated upon the flange 106. The key for the lock is indicated in dotted lines at 122.

Referring to Figs. 8 and 9 a modification is indicated in which no supplemental lock like 114 is required. In this instance the hub of the wheel is indicated at 141, with its sleeve 142, similar to 40. A detachable cap for the hub is shown at 145. A cap 148 rotatably bears on the sleeve 142, and has integral therewith at its axially inner end the spur gear 149, similar to 82. The cap 148 is indicated with the stepped head 150 from which extends the sleeve 152, having the square opening 153. A bearing ring 155 bears upon the head 150 and has extending therefrom the arms 156, which latter are detachably connected to the hub 141 by the screws 158. A supplemental locking cover 162 is indicated having the square pocket 163 and the octagonal pocket 164. An annular flange 165 having the plurality of curved openings or arcuate slots 166 is integral with the cover 162. A pot 170 is indicated with the flange 171 and the head 172 having the octagonal pocket 173. An inner hub is indicated at 126, and supports the pot 170. The screws 174 maintain the pot 170 in place. From the bearing ring 155 extend the studs 175, which pass through the curved openings 166. Wing nuts 177 are provided for the studs 175 to lock the cover 162 in place. By means of the cover 162, the cap 148 is locked against rotation relative to the demountable wheel when the wing nuts 177 are screwed down hard against the annular flange 165. When the nuts 177 are rotated so as to back them slightly, the cap 148 may then be rotated relative to the demountable wheel within the limits of the arcuate slots 166.

Referring to Figs. 1 to 7, to secure the wheel 20 in place, the sleeve 40 is mounted on the barrel 51 in position so that the circular openings 34 register with the pinions 89 and the wall 33 is brought to bear against the flange 45. The wheel is then turned in the direction of the arrow A, Fig. 3, until the curved end portions 36 of the curved openings 35 bear against the shanks 56 of the studs. A wrench is then inserted into the rectangular opening 84, and said wrench is turned whereby the cap 78, with its spur gear 82 is turned. The said spur gear 82 will turn the pinions 89, which latter will move down the threaded stems 57, until they are simultaneously clamped to the clamping and locking wall 33. The wrench is now removed and the square barrel 115 of the supplemental lock 114, is inserted into the rectangular opening 84 and the octagonal plug 116 is inserted into the octagonal pocket 74 of the grease pot. The key 122 of the lock is turned to enter the bolts 117 into a pair of the locking openings 86.

To detach the wheel 20 from the brake housing 42, the key 122 is turned to unlock the bolts 117 from the locking openings 86, and the lock 114 is removed. The wrench is now inserted into the rectangular opening 84 and turned to disengage the pinions 89 from the clamping and locking wall 33. The wheel 20 is now turned in a direction opposite the arrow A, until the stop plugs 37 bear against the said pinions 89 and thereby the circular openings 34 are brought into register with said pinions 89, and the wheel can be removed from the brake housing 42.

With the modification indicated in Figs. 8 and 9 to position the wheel 20 in place, the detachable cap 145 is removed from the hub 141 and the locking cover 162 is removed from the sleeve 152. Next a wrench is inserted in the square opening 153 and turned, as already described, which clamps the pinions 89 against the clamping and locking plate 33, not shown. Next the locking cover 162 is fastened in place and the cap 145 is sprung in place.

To detach the wheel indicated in Figs. 8 and 9 the operator first removes the cap 145 from the hub 141 and then removes the cover 162 from the sleeve 152. The operator then inserts a wrench in the square opening 153, turns the wrench to unlock the pinions 89 from the wall 33, and proceeds as already described.

Various modifications may be made in the invention and the present exemplifications are to be taken as illustrative and not limitative thereof.

Having described the invention, I claim:

1. In a locking device for a vehicle wheel, the combination of an inner hub, a radial flange integral with the inner hub, a hub for the wheel of the vehicle, a clamping and locking wall integral with the latter hub, said wall having openings, a sleeve extending from said wall supported on said inner hub, a cap rotatively supported on the sleeve, a spur gear integral with the cap, a grease pot supported on the outer end of the inner hub, the axially outer portion of said cap adapted to engage the outer end of said grease pot when the vehicle wheel is secured to the inner hub, means to secure said cap detachably to the wheel hub, threaded studs extending from said radial flange and adapted to pass through the openings in said clamping and locking wall, pinions threaded on said studs and adapted to engage the spur gear of said cap, said cap adapted to be rotated in one direction to turn said pinions and thus clamp said clamping and locking wall between the pinions and said radial flange, and in the opposite direction to release the wheel, so that it may be removed from the inner hub.

2. In a locking device for a vehicle wheel the combination of an inner hub, a radial flange integral with the inner hub, a hub for the wheel, a clamping and locking wall having openings integral with the latter hub, a sleeve extending from said wall supported on the inner hub, a cap rotatively supported on said sleeve, said cap comprising a cylindrical shell, a spur gear integral with the open end of said shell, a head for the shell of said cap, a projection integral with the head of said shell, a barrel having a longitudinal rectangular opening extending therethrough integral with said projection, a pot supported upon and fastened to said inner hub, a head for the pot extending into said projection, studs in threaded engagement with said radial flange, passing through the openings of said clamping and locking wall, a shank for each stud, a threaded stem extending from each shank, a locking pinion in threaded engagement with each threaded stem and in mesh with said spur gear, a bearing ring positioned upon said cap and having radially extending arms secured to the wheel hub to hold the cap in operative position on said wheel hub.

CASIMIRO FERRO.